Patented Feb. 19, 1929.

1,702,823

UNITED STATES PATENT OFFICE.

OREL M. FISHER, OF BELLE VERNON, PENNSYLVANIA.

GAPEWORM PREVENTIVE.

No Drawing. Application filed January 18, 1927. Serial No. 161,966.

This invention relates to compounds for treating poultry and more particularly to a combination of ingredients adapted to be placed in the drinking water or food of poultry to prevent small chickens from being afflicted with "gapes". This ailment is caused by small red worms which become lodged in the windpipes of small chickens and interfere with their breathing so that they have to gasp for breath and if not removed will cause the chickens to die. When a chicken is afflicted with the gapes, it is customary to double a horse hair or the like in order to form a loop which is thrust down the chicken's throat and the loop rotated which causes the worm in the chicken's windpipe to become entangled in the loop so that the worm can be removed when the loop is withdrawn. This method is effective to some extent but it is a tedious process and very often causes the chicken's throat to be injured which results in death of the chicken and also very often all of the worms in the chicken's throat are not removed. Therefore, an object of this invention is to provide a substance which may be placed in the drinking water and prevent the chickens from being afflicted with gapeworms.

The compound forming the subject-matter of this invention and which may be referred to as a gapeworm preventive consists of seven parts by weight of slacked lime (calcium oxide) and one part of Venetian red (iron oxide). The slacked lime and Venetian red are sifted together so that they become thoroughly mixed and are then ready for use. When used, a small quantity of the mixture is placed in the pan or other receptacle containing drinking water for the chickens and becomes dissolved in the water. In actual practice, it has been found that flocks of chickens supplied with plain water are subject to gapeworms, whereas when they are supplied with drinking water having a small quantity of this mixture placed therein they are not afflicted by the gapeworms. While the proportions set forth above are preferred, it might be found desirable to vary them and, therefore, changes in the formula, such as come within the scope of the appended claims, are reserved.

Having thus described the invention, I claim:

1. A composition to prevent gapeworms adapted to be dissolved in drinking water of poultry and having calcium oxide as its major ingredient and Venetian red as a minor ingredient, both ingredients being in a pulverized condition and intermixed before being placed in the drinking water.

2. A composition to prevent gapeworms adapted to be dissolved in drinking water of poultry and consisting of seven parts of calcium oxide and one part of Venetian red, both ingredients being pulverized and intermixed before being placed in the drinking water.

In testimony whereof I affix my signature.

OREL M. FISHER. [L. S.]